United States Patent
Nair et al.

(10) Patent No.: US 6,767,951 B2
(45) Date of Patent: *Jul. 27, 2004

(54) POLYESTER NANOCOMPOSITES

(75) Inventors: Mridula Nair, Rochester, NY (US); Narasimharao Dontula, Rochester, NY (US); Thomas N. Blanton, Rochester, NY (US); Jeffrey R. Gillmor, Brockport, NY (US); Debasis Majumdar, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 230 days.

This patent is subject to a terminal disclaimer.

(21) Appl. No.: 10/006,545

(22) Filed: Nov. 13, 2001

(65) Prior Publication Data

US 2003/0100655 A1 May 29, 2003

(51) Int. Cl.$^7$ .................................................. C08K 3/34
(52) U.S. Cl. ...................... 524/445; 524/447; 501/147
(58) Field of Search ................................ 524/445, 446, 524/447

(56) References Cited

U.S. PATENT DOCUMENTS

| | | |
|---|---|---|
| 4,739,007 A | 4/1988 | Okada et al. |
| 4,810,734 A | 5/1989 | Kawasumi et al. |
| 4,894,411 A | 1/1990 | Okada et al. |
| 5,102,948 A | 4/1992 | Deguchi et al. |
| 5,164,440 A | 11/1992 | Deguchi et al. |
| 5,164,460 A | 11/1992 | Yano et al. |
| 5,248,720 A | 9/1993 | Deguchi et al. |
| 5,385,776 A | 1/1995 | Maxfield et al. |
| 5,514,734 A | 5/1996 | Maxfield et al. |
| 5,552,469 A | 9/1996 | Beall et al. |
| 5,578,672 A | 11/1996 | Beall et al. |
| 5,698,624 A | 12/1997 | Beall et al. |
| 5,721,306 A | 2/1998 | Tsipursky et al. |
| 5,747,560 A | 5/1998 | Christiani et al. |
| 5,804,613 A | 9/1998 | Beall et al. |
| 5,830,528 A | 11/1998 | Beall et al. |
| 5,880,197 A | 3/1999 | Beall et al. |
| 5,973,053 A | 10/1999 | Usuki et al. |
| 6,579,927 B1 * | 6/2003 | Fischer ........................ 524/445 |

FOREIGN PATENT DOCUMENTS

| | | |
|---|---|---|
| EP | 0 846 660 A2 | 6/1998 |
| EP | 0 846 661 A2 | 6/1998 |
| JP | 3-062846 | 3/1991 |
| JP | 7-166036 | 6/1995 |
| JP | 8-073710 | 3/1996 |
| JP | 8-120071 | 5/1996 |
| WO | 93/04118 | 3/1993 |
| WO | 98/29499 | 7/1998 |
| WO | 00/34393 | 6/2000 |

OTHER PUBLICATIONS

Ed. T.J. Pinnavia and G.W. Beall, John Wiley & Sons, Ltd. Publishers, Polmer–Clay Nanocomposites, 2000.
H. van Olphen, John Wiley & Sons, Ltd. Publishers, An Introduction To Clay Colloid Chemistry, 1963, 1977.

* cited by examiner

Primary Examiner—Katarzyna Wyrozebski
(74) Attorney, Agent, or Firm—Lynne M. Blank

(57) ABSTRACT

An article comprising a matrix polymer and clay wherein said clay is intercalated with a block copolymer, wherein said block copolymer comprises a hydrophilic block capable of intercalating said clay and a matrix compatible block compatible with said matrix polymer.

47 Claims, 1 Drawing Sheet

US 6,767,951 B2

POLYESTER NANOCOMPOSITES

CROSS REFERENCE TO RELATED APPLICATIONS

Reference is made to commonly assigned, co-pending U.S. Patent Applications: Publication Number 2003/0099815 to Dontula et al., filed of even date herewith entitled "Ethoxylated Alcohol Intercalated Smectite Materials and Method"; Publication Number 2003/by Majumdar et al., filed of even date herewith entitled "Smectite Clay Intercalated with Polyether Block Polyamide Copolymer", and Publication Number 2003/1418918 by Dontula et al., filed of even date herewith entitled "Article Utilizing Block Copolymer Intercalated Clay", disclosures of which are incorporated here by reference.

FIELD OF THE INVENTION

The invention relates to layered materials such as clay, which are intercalated by a block copolymer(s) and compatibilized in a polyester matrix polymer.

BACKGROUND OF THE INVENTION

Ever since the seminal work conducted at Toyota Central Research Laboratories, polymer-clay nanocomposites have generated a lot of interest across industry. The utility of inorganic nanoparticles as additives to enhance polymer performance has been well established. Over the last decade or so, there has been an increased interest in academic and industrial sectors towards the use of inorganic nanoparticles as property enhancing additives. The unique physical properties of these nanocomposites have been explored by such varied industrial sectors as the automotive industry, the packaging industry, and plastics manufactures. These properties include improved mechanical properties, such as elastic modulus and tensile strength, thermal properties such as coefficient of linear thermal expansion and heat distortion temperature, barrier properties, such as oxygen and water vapor transmission rate, flammability resistance, ablation performance, solvent uptake, etc. Some of the related prior art is illustrated in U.S. Pat. Nos. 4,739,007; 4,810,734; 4,894,411; 5,102,948; 5,164,440; 5,164,460; 5,248,720; 5,854,326; and 6,034,163.

In general, the physical property enhancements for these nanocomposites are achieved with less than 20 vol. % addition, and usually less than 10 vol. % addition of the inorganic phase, which is typically clay or organically modified clay. Although these enhancements appear to be a general phenomenon related to the nanoscale dispersion of the inorganic phase, the degree of property enhancement is not universal for all polymers. It has been postulated that the property enhancement is very much dependent on the morphology and degree of dispersion of the inorganic phase in the polymeric matrix.

The clays in the polymer-clay nanocomposites are ideally thought to have three structures: (1) clay tactoids wherein the clay particles are in face-to-face aggregation with no organics inserted within the clay lattice; (2) intercalated clay wherein the clay lattice has been expanded to a thermodynamically defined equilibrium spacing due to the insertion of individual polymer chains, yet maintaining a long range order in the lattice; and (3) exfoliated clay wherein singular clay platelets are randomly suspended in the polymer, resulting from extensive penetration of the polymer into the clay lattice and its subsequent delamination. The greatest property enhancements of the polymer-clay nanocomposites are expected with the latter two structures mentioned herein above.

Clays are hydrophilic hence they are not compatible with most organic molecules, specifically the hydrophobic thermoplastic polymers. There has been considerable effort put towards developing materials and methods for dispersing and compatibilizing nanoclays in polymers like polyesters. This is because polyesters are plastics which are used in large volume in fibers, films, food and beverage containers and engineering applications. Some of the polyesters of most commercial interest are poly(ethylene terepthalate) (PET), poly(butylene terepthalate) (PBT), poly(ethylene napthalate) (PEN) and amorphous glycol modified PET (PETG). Preparation techniques for polyester-clay nanocomposites can be divided into two broad categories. One category is called in-situ incorporation or in-situ polymerization where the smectites are treated and added during polymerization. The clays may be added along with the monomers or during the polymerization process. The other category is to melt mix polyesters with treated clays by a compounding process.

The monomers for polyesters are polar. During the polymerization process, the polarity decreases as the molecular weight increases, phase separation of clay and polymer occurs. Hence compatibility between the clays and polymer is important. To enhance the compatibility of the clays, two general routes exist for in-situ clay incorporation. The first is based on a novel technology developed by AMCOL international corporation as disclosed in U.S. Pat. Nos. 5,578,672; and 5,721,306 where clays treated with a polar polymer like poly(vinylpyrrolidone) (PVP) or poly (vinylalcohol) (PVOH) are exfoliated into ethylene glycol, a monomer for PET. This exfoliation of clay is maintained during polymerization process by altering the polymerization conditions. Eastman Chemical (WO 98/29499) used a similar clay modification technique and introduced directly into the charge of a PET melt polymerization with DMT to prepare PET nanocomposites having an improved oxygen barrier. The other route is in-situ incorporation of an organoclay or synthetic clays or sintered clays like fluoromica (JP 8-73710, JP 8-120071). Organoclays are typically prepared using the ion exchange method where an onium ion (JP 3-62846), ammonium salts (JP 7-166036) are used to expand the clay.

In the melt compounding process, the resin is melt mixed with organoclays (WO 93/04118), synthetic clays or clays modified by a technique developed by AMCOL international corporation (vide, for example, U.S. Pat. Nos. 5,552,469; 5,578,672; 5,698,624; 5,804,613; and 5,830,528). U.S. Pat. No. 5,552,469 discusses a technique for dispersing clays in a water soluble polymer like PVP, PVOH which is then dried, and then melt mixed in a thermoplastic resin. U.S. Pat. No. 5,578,672 discusses a process of modifying clays by mixing it with water and polymer with functional groups. This is then dried and mixed with polymer resins. U.S. Pat. No. 5,698,624 discusses use of monomers with benzene ring, hydroxyl group, carboxyl group or low molecular weight polymers to intercalate clays using nonaqueous solvents. This is then later mixed with polymers like polyesters. U.S. Pat. Nos. 5,804,613 and 5,830,528 discuss a similar method of intercalating clays but with different functional monomers in presence of water, prior to mixing the dried clays with the thermoplastics.

In order to further facilitate delamination and prevent reaggregation of the clay particles, these intercalated clays are required to be compatible with the matrix polymer in which they are to be incorporated. This can be achieved through the careful selection and incorporation of compatibilizing or coupling agents, which consist of a portion which bonds to the surface of the clay and another portion which bonds or interacts favorably with the matrix polymer. Compatibility between the matrix polymer and the clay particles ensures a favorable interaction which promotes the dispersion of the intercalated clay in the matrix polymer. Effective compatibilization leads to a homogenous dispersion of the clay particles in the typically hydrophobic matrix polymer and/or an improved percentage of exfoliated or delaminated clay. Typical agents known in the art include general class of materials such as organosilane, organozirconate and organotitanate coupling agents. However, the choice of the compatibilizing agent is very much dependent on the matrix polymer as well as the specific component used to intercalate the clay, since the compatibilizer has to act as a link between the two.

A survey of the art, makes it clear that there is a lack of general guideline for the selection of the intercalating and compatibilizing agents for a specific matrix polymer and clay combination. Even if one can identify these two necessary components through trial and error, they are usually incorporated as two separate entities, usually in the presence of water followed by drying, in a batch process and finally combined at a separate site with the matrix polymer during melt-processing of the nanocomposite. Such a complex process obviously adds to the cost of development and manufacturing of the final product comprising such a nanocomposite. There is a critical need in the art for a comprehensive strategy for the development of better materials and processes to overcome some of the aforementioned drawbacks.

Imaging elements such as photographic elements usually comprise a flexible thermoplastic base on which is coated the imaging material such as the photosensitive material. The thermoplastic base is usually made of polymers derived from the polyester family such as polyethylene terephthalate (PET), polyethylene naphthalate (PEN) and cellulose triacetate (TAC). Films for color and black and white photography, and motion picture print film are examples of imaging media comprising such flexible plastic bases in roll form. TAC has attributes of high transparency and curl resistance after processing but poor mechanical strength. PET on the other hand has excellent mechanical strength and manufacturability but undesirable post process curl. The two former attributes make PET more amenable to film thinning, enabling the ability to have more frames for the same length of film. Thinning of the film however causes loss in mechanical strength. The stiffness will drop as the cube root of the thickness of the film. Also a photosensitive material coated on the base in a hydrophilic gelatin vehicle will shrink and curl towards the emulsion when dry. There is hence a need for a base that is thinner yet stiff enough to resist this stress due contraction forces. Further, in motion picture print film image distortion arises from thermal buckle of the plastic film caused by the heat generated by the projector bulb. Hence a transparent film base that has dimensional stability at high temperatures due to its higher heat capacity is also highly desirable.

SUMMARY OF THE INVENTION

It is an object of the invention to provide an intercalated clay. In some cases, this intercalation might result in exfoliation too. It is a further object of the invention to provide an intercalated clay which further comprises a component compatible with a matrix polymer in which the clay can be dispersed. It is a further object of the invention that the matrix polymer is a polyester resin. It is an even further object of the invention to provide an article comprising a matrix polymer and an intercalated clay wherein said intercalated clay comprises a matrix compatible component. These and other objects of the invention are accomplished by providing an article comprising a matrix polymer and clay wherein said clay is intercalated with a block copolymer, wherein said block copolymer comprises a hydrophilic block capable of intercalating said clay and a matrix compatible block compatible with said matrix polymer.

DETAILED DESCRIPTION OF THE INVENTION

Figure 1:
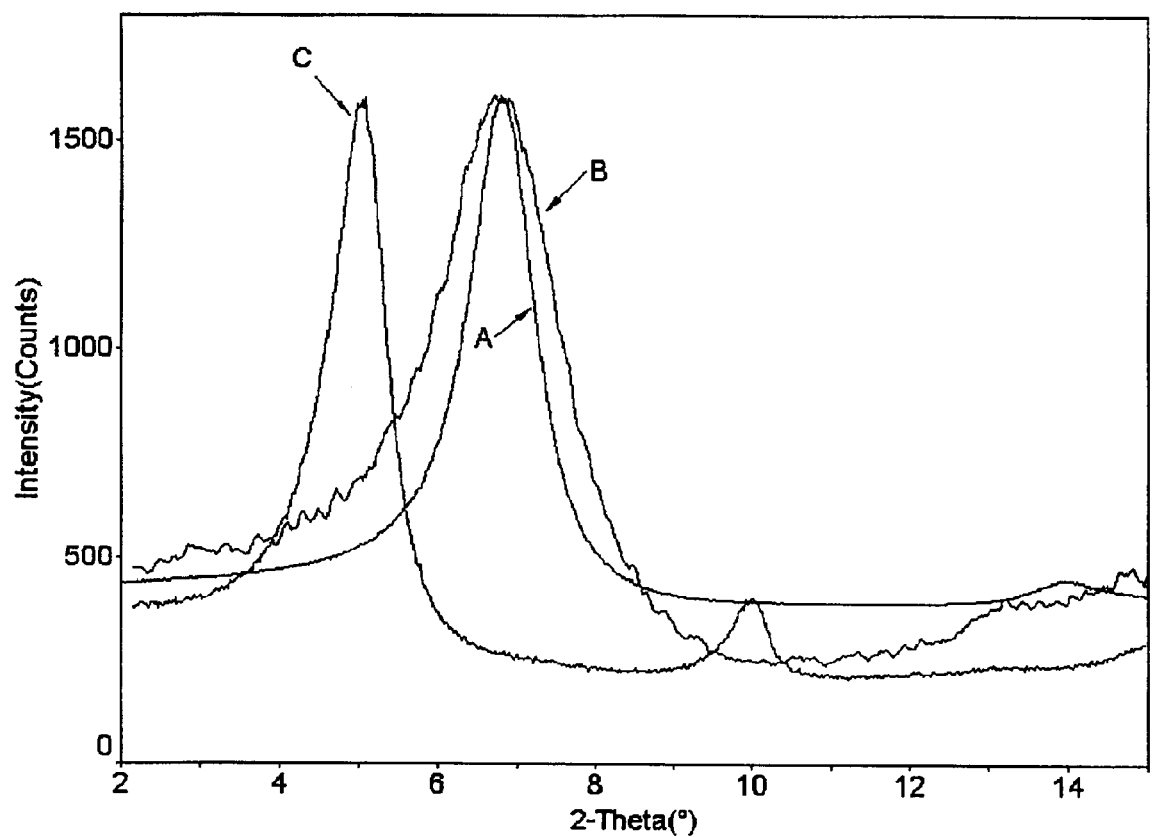
FIG. 1 shows XRD patterns from film samples of (A) NaCloisite clay (B) NaCloisite clay and polycaprolactone composite and (C) NaCloisite clay and poly(ethylene oxide-b-caprolactone) (PEO-b-PCL) composite.

The invention has numerous advantages. It provides an intercalated clay which can be effectively incorporated to form a polymer-clay nanocomposite. The matrix polymer of interest are polyesters. Such polyester-clay nanocomposites can be further incorporated in an article of engineering application with improved physical properties such as improved modulus, tensile strength, toughness, impact resistance, electrical conductivity, heat distortion temperature, coefficient of linear thermal expansion, fire retardance, oxygen and water vapor barrier properties, and the like. The application of such articles in a number of industrial sectors, such as automotive, packaging, battery, cosmetics, etc. have been elucidated in the literature (vide, for example, "Polymer-clay Nanocomposites", Ed. T. J. Pinnavia and G. W. Beall, John Wiley & Sons, Ltd. Publishers).

These and other objects of the invention are accomplished by providing a clay, which comprises a clay intercalated with an amphiphilic block copolymer. The said amphiphilic block copolymer of the invention comprises a hydrophilic block capable of intercalating the clay. The said block copolymer also comprises a block that does not intercalate the clay. The block copolymer further comprises a matrix compatible block that is an oleophilic polymer, and particularly suitable for polyester resins.

The invention has an additional advantage of intercalating the clay with a block copolymer wherein one block is chosen to be a hydrophilic polymer which is capable of intercalating the clay. The clay surface being hydrophilic, this block has a natural affinity to the clay surface and can readily enter the clay lattice and intercalate the clay. The aforesaid block copolymer further comprises a matrix compatible block that is oleophilic. The aforesaid block copolymer even further comprises a block that does not enter the clay lattice, hence, does not intercalate the clay. Such an example may be polyester. Such a design of the block copolymer ensures that a component of the block copolymer will intercalate the clay and another component, the matrix compatible block, will compatibilize the intercalated clay with a hydrophobic matrix polymer. Thus, two necessary criteria of effectively dispersing clay in a polymer to form a desirable polymer-clay nanocomposite, namely clay intercalation and compatibilization, can be fulfilled by the choice of the block copolymer of this invention. The block copolymer, in essence, replaces two separate materials: clay intercalant and compatibilizer.

Another advantage of the invention arises from the fact that the block copolymer can be incorporated in the clay in an essentially dry state (i.e., without involving any aqueous medium). This feature eliminates the need for a costly and time consuming drying step in the preparation of the intercalated clay.

Another advantage of the invention derives from the fact that the clay, the block copolymer and the matrix polymer (here a polyester) can all be combined in a single step in a suitable compounder, thus, adding greatly to the efficiency of the manufacturing process.

Another advantage of the invention is that it teaches of a general strategy wherein the chemistry of the block copolymer can be tailored according to the choice of the clay and the specific matrix polymer. Additionally, the molecular weights and the ratios of the blocks can be controlled easily to meet the processing conditions, such as temperature, shear, viscosity and product needs, such as various physical properties.

These and other advantages will be apparent from the detailed description below.

Whenever used in the specification the terms set forth shall have the following meaning:

"Nanocomposite" shall mean a composite material wherein at least one component comprises an inorganic phase, such as a smectite clay, with at least one dimension in the 0.1 to 100 nanometer range.

"Plates" shall mean particles with two comparable dimensions significantly greater than the third dimension, e.g, length and width of the particle being of comparable size but orders of magnitude greater than the thickness of the particle.

"Layered material" shall mean an inorganic material such as a smectite clay that is in the form of a plurality of adjacent bound layers.

"Platelets" shall mean individual layers of the layered material.

"Intercalation" shall mean the insertion of one or more foreign molecules or parts of foreign molecules between platelets of the layered material, usually detected by X-ray diffraction technique, as illustrated in U.S. Pat. No. 5,891,611 (line 10, col. 5–line 23, col. 7).

"Intercalant" shall mean the aforesaid foreign molecule inserted between platelets of the aforesaid layered material.

"Exfoliation" or "delamination" shall mean separation of individual platelets in to a disordered structure without any stacking order.

"Intercalated" shall refer to layered material that has at least partially undergone intercalation and/or exfoliation.

"Organoclay" shall mean clay material modified by organic molecules.

The clay material suitable for this invention can comprise any inorganic phase desirably comprising layered materials in the shape of plates with significantly high aspect ratio. However, other shapes with high aspect ratio will also be advantageous, as per the invention. The clay materials suitable for this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, particularly useful with anionic matrix polymers, are the layered double hydroxides or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be intercalated with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4\text{-}2H_2O$, $CaPO_4CH_3\text{—}H_2O$, $MnHAsO_4\text{—}H_2O$, $Ag_6Mo_{10}O_{33}$ and the like. Preferred clays are swellable so that other agents, usually organic ions or molecules, can intercalate and/or exfoliate the layered material resulting in a desirable dispersion of the inorganic phase. These swellable clays include phyllosilicates of the 2:1 type, as defined in clay literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred clays for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred clays include montmorillonite, hectorite and hydrotalcites, because of their effectiveness in the present invention and the commercial availability of these materials.

The aforementioned clay can be natural or synthetic, for example synthetic smectite clay. This distinction can influence the particle size and/or the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the clay particles should have a lateral dimension of between 0.01 $\mu$m and 5 $\mu$m, and preferably between 0.05 $\mu$m and 2 $\mu$m, and more preferably between 0.1 $\mu$m and 1 $\mu$m. The thickness or the vertical dimension of the clay particles can vary between 0.5 nm and 10 nm, and preferably between 1 nm and 5 nm. The aspect ratio, which is the ratio of the largest and smallest dimension of the clay particles should be >10:1 and preferably >100:1 and more preferably >1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment as well as the imaging layers.

The clay used in this invention can be an organoclay. Organoclays are produced by interacting the unfunctionalized clay with suitable intercalants. These intercalants are typically organic compounds, which are neutral or ionic. Useful neutral organic molecules include polar molecules such as amides, esters, lactams, nitriles, ureas, carbonates, phosphates, phosphonates, sulfates, sulfonates, nitro compounds, and the like. The neutral organic intercalants can be monomeric, oligomeric or polymeric. Neutral organic molecules can cause intercalation in the layers of the clay through hydrogen bonding, without completely replacing the original charge balancing ions. Useful ionic compounds are cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays are available from clay vendors, which may be used in the practice of this invention.

The block copolymers of the invention are amphiphilic and have a hydrophilic and an oleophilic component. Further, the block copolymers of the invention can be of the two block or "A-B" type where A represents the hydrophilic component and B represents the oleophilic component of the three block or "A-B-A" type. For example, the block copolymer may comprise three blocks and the matrix may comprise a copolymer or a blend of polymers compatible with at least one matrix compatible block of the copolymer. Also, where the matrix is a blend of polymers, individual polymers in the blend may be compatible with separate blocks of the copolymers. One presently preferred class of polymeric components that is useful for the hydrophilic component in this invention is poly(alkylene oxides) such as poly(ethylene oxide), because of their well-known ability to intercalate clay lattices through hydrogen bonding and ionic interactions, as well as their thermal processability, lubricity, etc. The term poly(alkylene oxides) as used herein includes polymers derived from alkylene oxides such as poly (ethylene oxides) including mixtures of ethylene and propylene oxides. The most preferred is poly(ethylene oxide), mainly because of its effectiveness in the present invention, commercial availability in a range of molecular weights and chemistries affording a wide latitude in the synthesis of the block copolymers.

Poly(ethylene oxides) are well known in the art and are described in, for example U.S. Pat. No. 3,312,753 at column 4. Useful (alkylene oxide) block contains a series of interconnected ethyleneoxy units and can be represented by the formula:

wherein the oxy group of one unit is connected to an ethylene group of an adjacent ethylene oxide group of an adjacent ethyleneoxy unit of the series.

Other useful hydrophilic components include poly 6, (2-ethyloxazolines), poly(ethyleneimine), poly (vinylpyrrolidone), poly(vinyl alcohol), poly (vinyl acetate), polyacrylamides, polyacrylonitrile, polysaccharides and dextrans.

The oleophilic component or matrix compatible block of the polymers useful in the present invention can also be selected from many common components. The oleophilic component is characterized in that it is at least partially miscible in the matrix polymer of the invention, and/or interacts with the matrix polymer, for example, through transesterfication. In the case of a polyester matrix, the matrix compatible block comprises polyester. Exemplary oleophilic components can be derived from monomers in such as: caprolactone; propiolactone; β-butyrolactone; δ-valerolactone; ε-caprolactam; lactic acid; glycolic acid; hydroxybutyric acid; acrylic, amide, derivatives of lysine; and derivatives of glutamic acid. Polymeric forms would include polycaprolactone; polypropiolactone; ply β-butyrolactone; poly δ-valerolactone; poly ε-caprolactam; poly lactic acid; poly glycolic acid; poly hydroxybutyric acid; polyacrylic, polyamide, poly derivatives of lysine; and poly derivatives of glutamic acid.

The molecular weights of the hydrophilic component and the oleophilic component are not critical. A useful range for the molecular weight of the hydrophilic component is between about 300 and 50,000 and preferably 1,000 and 25,000. The molecular weight of the oleophilic component is between about 1,000 and 100,000 and preferably between 2,000 and 50,000. Preferably, the matrix compatible block will comprise 50 to 500 monomer repeat units. The preferred molecular weight ranges are chosen to ensure ease of synthesis and processing under a variety of conditions. Most preferably, these repeat units will comprise caprolactone in a polyester polymer matrix, to ensure compatibility. The matrix polymer of the invention can be any polymer but preferred to be thermoplastic polymers, copolymers or interpolymers and/or mixtures thereof, and vulcanizable and thermoplastic rubbers. The matrix polymer of choice for this invention belongs to the polyester family. The preferred polyesters are linear polyesters, because of their superior physical properties and processability.

The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters, including crystalline and amorphous polyesters, having wide variations in physical properties is suitable for use in the process of this invention.

The particular polyester chosen for use as the matrix polymer can be a homo-polyester or a co-polyester, or mixtures thereof as desired. Polyesters are normally prepared by the condensation of an organic dicarboxylic acid and an organic diols, and, therefore, illustrative examples of useful polyesters will be described herein below in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters. Exemplary of useful cycloaliphatic, aliphatic and aromatic polyesters which can be utilized in the practice of their invention are poly(ethylene terephthalate), poly (cyclohexlenedimethylene), terephthalate) poly(ethylene dodecate), poly(butylene terephthalate), poly(ethylene naphthalate), poly(ethylene(2,7-naphthalate)), poly (methaphenylene isophthalate), poly(glycolic acid), poly (ethylene succinate), poly(ethylene adipate), poly(ethylene sebacate), poly(decamethylene azelate), poly(ethylene sebacate), poly(decamethylene adipate), poly (decamethylene sebacate), poly(dimethylpropiolactone), poly(para-hydroxybenzoate) (Ekonol), poly(ethylene oxybenzoate) (A-tell), poly(ethylene isophthalate), poly (tetramethylene terephthalate, poly(hexamethylene terephthalate), poly(decamethylene terephthalate), poly(1,4-cyclohexane dimethylene terephthalate) (trans), poly (ethylene 1,5-naphthalate), poly(ethylene 2,6-naphthalate), poly(1,4-cyclohexylene dimethylene terephthalate), (Kodel) (cis), and poly(1,4-cyclohexylene dimethylene terephthalate (Kodel) (trans).

Polyester compounds prepared from the condensation of a diol and an aromatic dicarboxylic acid are preferred for use in this invention as matrix polymers because of their melt processability, strength and flexibility as substrates particularly for imaging elements. Illustrative of such useful aromatic carboxylic acids are terephthalic acid, isophthalic acid and a o-phthalic acid, 1,3-napthalenedicarboxylic acid, 1,4 napthalenedicarboxylic acid, 2,6-napthalenedicarboxylic acid, 2,7-napthalenedicarboxylic acid, 4,4'-diphenyldicarboxylic acid, 4,4'-diphenysulfphone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Amongst these preferred acid precursors, terephthalic acid is particularly preferred acid precursor because it leads to polyesters that are less prone to degradation during melt processing and more dimensionally stable.

Preferred polyesters for use in the practice of this invention include poly(ethylene terephthalate), poly(butylene terephthalate), poly(1,4-cyclohexylene dimethylene terephthalate) and poly(ethylene naphthalate), and copolymers and/or mixtures thereof. Among these polyesters of choice, PET is most preferred because of its effectiveness in the present invention, excellent mechanical strength and manufacturability.

For the practice of the present invention, it is important to ensure compatibility between the matrix polymer and at least one of the blocks of the copolymer used for clay intercalation. If the matrix polymer comprises a blend of polymers, the polymers in the blend should be compatible with at least one of the blocks of the copolymer used for clay intercalation. If the matrix polymer comprises copolymer(s), the copolymer(s) should be compatible with at least one of the blocks of the copolymer used for clay intercalation.

The clay and the block copolymer of the invention can be interacted for intercalation by any suitable means known in the art of making nanocomposites. For example, the clay can be dispersed in suitable monomers or oligomers, which are subsequently polymerized. Alternatively, the clay can be melt blended with the block copolymer, oligomer or mixtures thereof at temperatures preferably comparable to their melting point or above, and sheared. In another method, the clay and the block copolymer can be combined in a solvent phase to achieve intercalation, followed by solvent removal through drying. Of the aforesaid methods, the one involving melt blending is preferred, for ease of processing.

In a preferred embodiment of the invention the clay, together with any optional addenda, is melt blended with the block copolymer of the invention in a suitable twin screw compounder, to ensure proper mixing. An example of a twin screw compounder used for the experiments detailed below is a Leistritz Micro 27. Twin screw extruders are built on a building block principle. Thus, mixing of additives, residence time of resin, as well as point of addition of additives can be easily changed by changing screw design, barrel design and processing parameters. The Leistritz machine is such a versatile machine. Similar machines are also provided by other twin screw compounder manufacturers like Werner and Pfleiderrer, Berstorff etc. which can be operated either in the co-rotating or the counter-rotating mode. The Leistritz Micro 27 compounder may be operated in the co-rotating or the counter rotating mode.

The screws of the Leistritz compounder are 27 mm in diameter, and they have a functionary length of 40 diameters. The maximum number of barrel zones for this compounder is 10. The maximum screw rotation speed for this compounder is 500 rpm. This twin screw compounder is provided with main feeders through which resins are fed, while additives might be fed using one of the main feeders or using the two side stuffers. If the side stuffers are used to feed the additives then screw design needs to be appropriately configured. The preferred mode of addition of clay to the block copolymer is through the use of the side stuffer, to ensure intercalation of the clay through proper viscous mixing and to ensure dispersion of the filler through the polymer matrix as well as to control the thermal history of the additives. In this mode, the block copolymer is fed using the main resin feeder, and is followed by the addition of clay through the downstream side stuffer. Alternatively, the clay and block copolymer can be fed using the main feeders at the same location.

In yet another embodiment of the invention, the clay, the block copolymer and the matrix polymer together with any optional addenda are melt blended in a suitable twin screw compounder. One of the preferred modes of addition of clay and the block copolymer to the matrix polymer is by the use of side stuffers to ensure intercalation of the clay through proper viscous mixing; the block copolymer first followed by the addition of clay through the downstream side stuffer or vice versa. The mode of addition will be determined by characteristics of the block copolymer. Alternatively, the clay and block copolymer are premixed and fed through a single side stuffer. This method is particularly suitable if there is only one side stuffer port available, and also there are limitations on the screw design. Also preferred are methods where the clay and block copolymer are fed using the main feeders at the same location as the matrix resin.

In another preferred embodiment of the invention, the clay, together with any optional addenda, is melt blended with the block copolymer of the invention using any suitable mixing device such as a single screw compounder, blender, mixer, spatula, press, extruder, molder, etc.

The optional addenda mentioned herein above can include nucleating agents, fillers, plasticizers, impact modifiers, chain extenders, colorants, lubricants, antistatic agents, pigments such as titanium oxide, zinc oxide, talc, calcium carbonate, etc., dispersants such as fatty amides, (e.g., stearamide), metallic salts of fatty acids, e.g., zinc stearate, magnesium stearate, etc., dyes such as ultramarine blue, cobalt violet, etc., antioxidants, fluorescent whiteners, ultraviolet absorbers, fire retardants, roughening agents, cross linking agents, voiding agents and the like. These optional addenda and their corresponding amounts can be chosen according to need.

Any method known in the art including those mentioned herein above can be utilized to form an article of the invention comprising a matrix polymer and the intercalated clay of the invention and other optional addenda. Such methods of formation include but are not limited to extrusion, co-extrusion with or without orientation by uniaxial or biaxial, simultaneous or consecutive stretching, blow molding, injection molding, lamination, solvent casting, coating, drawing, spinning, etc.

The article of the invention can be of any size and form, such as sheet, rod, particulate, powder, fiber, wire, tube, woven, non-woven, support, layer in a multilayer structure, and the like. The article of the invention can be used for any purpose such as packaging, woven or non-woven products, protective sheets or clothing, medical implement, etc.

In one preferred embodiment of the invention, the article of the invention comprises the base of an imaging member. Such imaging members include those utilizing photographic, electrophotographic, electrostatographic, photothermographic, migration, electrothermographic, dielectric recording, thermal dye transfer, inkjet and other types of imaging. In a more preferred embodiment of the invention, the article of the invention comprises the base of photographic imaging members, particularly photographic reflective print material, such as paper, and other display products.

Typical bases for imaging members comprise cellulose nitrate, cellulose acetate, poly(vinyl acetate), polystyrene, polyolefins, poly(ethylene terephthalate), poly(ethylene naphthalate), polycarbonate, polyamide, polyimide, glass, natural and synthetic paper, resin-coated paper, voided polymers, microvoided polymers and microporous materials, fabric, etc. The material of the invention comprising polyester and the intercalated clay can be incorporated in any of these materials and/or their combination for use in the base of the appropriate imaging member. In case of a multilayered imaging member, the aforementioned material of the invention can be incorporated in any one or more layers, and can be placed anywhere in the imaging support, e.g., on the topside, or the bottom side, or both sides, and/or in between the two sides of the support. The method of incorporation can include extrusion, co-extrusion with or without stretching, blow molding, casting, co-casting, lamination, calendering, embossing, coating, spraying, molding, and the like. The image receiving layer, as per the invention, can be placed on either side or both sides of the imaging support.

In one preferred embodiment, the imaging support of the invention comprising polyester as a matrix polymer and the intercalated clay of the invention may be formed by extrusion and/or co-extrusion, followed by orientation, as in typical polyester based photographic film base formation. Alternatively, a composition comprising a matrix polymer and the intercalated clay of the invention can be extrusion coated onto another support, as in typical resin coating operation for photographic paper. Yet in another embodiment, a composition comprising polyester as a matrix polymer and the intercalated clay of the invention can be extruded or co-extruded, preferably oriented, into a preformed sheet and subsequently laminated to another support, as in the formation of typical laminated reflective print media.

In a preferred embodiment, the material of this invention is incorporated in imaging supports used for image display such as reflective print media including papers, particularly resin-coated papers, voided polymers, and combinations thereof. Alternatively, the imaging support may comprise a combination of a relective medium and a transparent medium, in order to realize special effects, such as day and night display. In a preferred embodiment, at least one layer comprising the material of the present invention is incorporated in a support comprising paper, because of its widespread use. In another preferred embodiment, at least one layer comprising the nanocomposite of the present invention is incorporated in an imaging support comprising a voided polymer, because of its many desirable properties such as tear resistance, smoothness, improved reflectivity, metallic sheen, day and night display usage, and the like.

The imaging supports of the invention can comprise any number of auxiliary layers. Such auxiliary layers may include antistatic layers, back mark retention layers, tie layers or adhesion promoting layers, abrasion resistant layers, conveyance layers, barrier layers, splice providing layers, UV absorption layers, antihalation layers, optical effect providing layers, waterproofing layers, and the like.

The weight ratio of the clay:block copolymer can vary from 1:99 to 99:1. However it is preferred to be between 90:10 to 50:50 and more preferred to be between 80:20 and 60:40, in order to optimize the desirable physical properties of clay and the intercalation afforded by the block copolymer.

The weight % of clay in the article comprising the clay, the block copolymer and the matrix polymer together with any optional addenda can be as high as 70%. However it is preferred to be less than 50%, and more preferred to be less than 20%, to ensure processability.

The invention has been described in detail with particular reference to certain preferred embodiments thereof, but it will be understood that variations and modifications can be effected within the spirit and scope of the invention.

EXAMPLES

The following examples highlight the observation of intercalation of smectite clays using block copolymer. The clays used are: NaClosite, which is a natural montmorillonite and Cloisite 25A, which is a montmorillonite-based organoclay (both from Southern Clay Products). The polycaprolactones used in the examples are purchased from Aldrich. The block copolymers poly(ethylene oxide-b-caprolactone) (PEO-b-PCL) are prepared according to the procedure described below. (PEO-b-PCL) with PEO:PCL molecular weight ratio of 5K:20K, henceforth will be referred to as (PEO-b-PCL 5K–20K)

Poly(ethylene glycol) monomethyl ether (5K, 125 gms, purchased from Aldrich) is degassed and dried under reduced pressure at 100° C. in a 3-neck round bottom flask for one hour. It is then dissolved at room temperature in toluene (<0.001% water, 500 mls) under argon to give a 20% solution of the polymer and subsequently treated with 3 mls stannous octanoate catalyst (purchased from Sigma). The appropriate amount of ε-caprolactone (500 mls, 99%, purchased from Acros) is introduced into the reaction mixture, under argon using a transfer syringe and polymerized at 100–110° C. for 12 hrs. The polymer solution is then precipitated into large amounts of diethyl ether and filtered. (PEO-b-PCL) with PEO:PCL molecular weight ratio of 5K:10K, henceforth will be referred to as (PEO-b-PCL 5K–10K). These block copolymers are prepared following the same procedure as for (PEO-b-PCL 5K–20K), except using an appropriately less amount of caprolactone to attain a molecular weight of 10K.

The initial (001) basal plane spacing in ambient air for NaCloisite is 13 Å and for Cloisite 25A is 21 Å. An increase in the (001) basal plane spacing is evidence of intercalation and is measured by X-ray diffraction using a Rigaku Bragg-Brentano diffractometer utilizing a monochromator tuned to CuKα radiation.

The clay and block copolymer are weighed and combined at temperatures above the melting point of the block copolymer. The clay and block copolymer can be premixed before heating or the block copolymer can be melted first followed by addition of clay. An alternative method is to add clay during heating.

Examples 1–3

Samples Ex. 1–3 are prepared by weighing predetermined amounts of NaCloisite clay and PEO-b-PCL into a glass container. The mixtures are heated in an oven at 70° C., mixed with a spatula, heated on a hotplate, then mixed again with a spatula and cooled to ambient temperature (21° C.). An aliquot of each Ex. 1–3 in the solid state is placed between two polytetrafluoroethylene or polyimide sheets then pressed using a Carver press, with heated plates held at 175° C. The resulting film samples are analyzed by XRD for (001) basal plane spacing. XRD results for Ex. 1–3 and NaCloisite clay are summarized in Table 1. The data indicate that PEO-PCL does intercalate the NaCloisite clay, as reflected in an increase in the (001) basal plane spacing.

TABLE 1

| Sample | Clay Used | Block Copolymer Used | PEO Molecular wt. | PCL Molecular wt | Clay:Block Copolymer wt. ratio | (001) Spacing |
|---|---|---|---|---|---|---|
| Ex. 1 | NaCloisite | PEO-b-PCL 5K-20K | 5000 | 20000 | 12.5:87.5 | 18 Å |
| Ex. 2 | NaCloisite | PEO-b-PCL5K-20K | 5000 | 20000 | 25:75 | 18 Å |
| Ex. 3 | NaCloisite | PEO-b-PCL 5K-20K | 5000 | 20000 | 50:50 | 18 Å |
|  | NaCloisite | none |  |  | 100:0 | 13 Å |

Examples 4–6

Samples Ex. 4–6 are prepared by weighing predetermined amounts of NaCloisite or Cloisite 25A clay and PEO-b-PCL into separate glass containers. The PEO-b-PCL is heated on a hotplate until the PEO-b-PCL melted. Clay is added to this molten polymer and is mixed with a spatula, reheated and mixed again with a spatula. An aliquot of each sample Ex. 4–6 in the liquid state is deposited onto a glass microscope slide then smeared to make a film and allowed to cool to ambient temperature (21° C.). The resulting film samples are analyzed by XRD for (001) basal plane spacing. XRD results for Ex. 4–6 and NaCloisite and Cloisite 25A clay are summarized in Table 2. The data indicate that PEO-b-PCL intercalates both NaCloisite, which is a natural clay and Cloisite 25A, which is an organoclay.

TABLE 2

| Sample | Clay Used | Block Copolymer Used | PEO Molecular wt. | PCL Molecular wt | Clay:Block Copolymer wt. ratio | (001) Spacing |
|---|---|---|---|---|---|---|
| Ex. 4 | NaCloisite | PEO-b-PCL 5K-10K | 5000 | 10000 | 12.5:87.5 | 18 Å |
| Ex. 5 | NaCloisite | PEO-b-PCL 5K-20K | 5000 | 20000 | 12.5:87.5 | 18 Å |
| Ex. 6 | Cloisite 25A | PEO-b-PCL 5K-20K | 5000 | 20000 | 12.5:87.5 | 32 Å |
|  | NaCloisite | none |  |  | 100:0 | 13 Å |
|  | Cloisite 25A | none |  |  | 100:0 | 21 Å |

Examples 7–8

Samples Ex. 7–8 are prepared using an internal batch mixer like a Brabender. Other high intensity internal batch mixers like a Banbury can also be used. In these experiments, the batch mixer is heated to the temperature required to process polyethylene terephthalate (PET), this being around 276° C.–282° C. for the grade PET 7352 (Eastman Chemical Company). Initially the PET is charged to the mixer. To the softened PET is added the block copolymer PEO-b-PCL and then the NaCloisite clay is added. An aliquot of each sample Ex. 7–8 in the solid state is placed between two polytetrafluoroethylene or polyimide sheets then pressed using a Carver press, with heated plates held at 245° C. The resulting film samples are analyzed by XRD for (001) basal plane spacing. XRD results for Ex. 7–8 are summarized in Table 3. The data indicate that PEO-b-PCL does intercalate the NaCloisite clay in the PET matrix.

Samples Ex. 1–8 also demonstrate that the intercalation of clay with PEO-b-PCL can be accomplished by a number of mixing methods, and the (001) basal plane spacing is not particularly sensitive to the method of melt intercalation.

TABLE 3

| Sample | Clay Used | Block Copolymer Used | PEO Molecular wt. | PCL Molecular wt | matrix polymer | Clay:Block copolymer: PET wt. ratio | (001) Spacing |
|---|---|---|---|---|---|---|---|
| Ex. 7 | NaCloisite | PEO-b-PCL 5K-10K | 5000 | 10000 | PET | 4:9:87 | 17 Å |
| Ex. 8 | NaCloisite | PEO-b-PCL 5K-20K | 5000 | 20000 | PET | 4:9:87 | 18 Å |

Comparative Samples 1–6

Comparative samples Comp. 1–6 are prepared by weighing predetermined amounts of NaCloisite clay and polycaprolactone (PCL) of different molecular wt. into a glass container. The mixtures are heated in an oven at 70° C., mixed with a spatula, heated on a hotplate, then mixed again with a spatula and cooled to ambient temperature (21° C.). An aliquot of each Comp. 1–6 in the solid state is placed between two polytetrafluoroethylene or polyimide sheets then pressed using a Carver press, with heated plates held at 175° C. The resulting film samples are analyzed by XRD for (001) basal plane spacing. XRD results for Comp. 1–6 are summarized in Table 4. The data indicate that PCL does not intercalate the NaCloisite clay. This phenomenon is independent of the molecular weight of the PCL.

TABLE 4

| Sample | Clay Used | Polymer Used | PCL Molecular wt. | Clay:PCL Wt. ratio | (001) Spacing |
|---|---|---|---|---|---|
| Comp. 1 | NaCloisite | PCL | 10000 | 5:95 | 13 Å |
| Comp. 2 | NaCloisite | PCL | 10000 | 10:90 | 13 Å |

TABLE 4-continued

| Sample | Clay Used | Polymer Used | PCL Molecular wt. | Clay:PCL Wt. ratio | (001) Spacing |
|---|---|---|---|---|---|
| Comp. 3 | NaCloisite | PCL | 42000 | 5:95 | 13 Å |
| Comp. 4 | NaCloisite | PCL | 42000 | 10:90 | 13 Å |
| Comp. 5 | NaCloisite | PCL | 80000 | 5:95 | 13 Å |
| Comp. 6 | NaCloisite | PCL | 80000 | 10:90 | 13 Å |

Comparative Sample 7

Comparative sample Comp. 7 is prepared similar to samples Ex. 7 but without the block copolymer PEO-b-PCL of the invention. An aliquot of Comp. 7 in the solid state is placed between two polyimide sheets then pressed using a Carver press, with heated plates held at 260° C. The resulting film sample is analyzed by XRD for (001) basal plane spacing. The XRD result for Comp. 7 is summarized in Table 5. The data indicate that polyethylene terephthalate (PET), by itself, without the block copolymer of the invention, does not intercalate the NaCloisite clay. The data also indicate that the processing conditions utilized result in a reduction in the (001) basal plane spacing, possibly because of loss of lattice water.

TABLE 5

| Sample | Clay Used | Block Copolymer Used | matrix polymer | Clay:Block copolymer: PET wt. ratio | (001) Spacing |
|---|---|---|---|---|---|
| Comp. 7 | NaCloisite | none | PET | 4:0:96 | 10 Å |

Thermal analysis of PEO-b-PCL 5K–20K and its blend with PET.

Samples of (1) neat PEO-b-PCL 5K–20K and (2) a blend of PEO-b-PCL 5K–20K and PET in a 25:75 weight ratio, prepared similar to sample Ex. 8, are analyzed by differential scanning calorimetry. The melting point Tm of PEO and PCL are listed in Table 6. It is clear that although in the pure block copolymer the PEO and the PCL blocks have distinct melting points, in the blend no melting point is observed for the PCL block indicating its miscibility in the PET matrix. Additionally, the heat of fusion ΔHf of the block copolymer in the blend (containing 25% of the block copolymer), is found to be less than 25% of the ΔHf of the neat block copolymer. This finding further supports the miscibility of PCL in PET. It is postulated that the reduction in ΔHf of the blend arises from the inability of the PCL block to crystallize, as it mixes with the matrix PET.

TABLE 6

| Sample | PEO-b-PCL 5K-20K:PET wt. ratio | Tm (PCL) | Tm (PEO) |
|---|---|---|---|
| Sample 1 | 100:0 | 29.5° C. | 52.3° C. |
| Sample 2 | 25:75 | None detected | 55.3° C. |

FIG. 1 shows XRD patterns from film samples of (A) NaCloisite clay (B) NaCloisite clay and PCL composite with 10 weight percent NaCloisite and 90 weight percent PCL (sample Comp. 6) and (C) NaCloisite and poly(ethylene oxide-b-caprolactone) (PEO-b-PCL 5K–20K) with 12.5 weight percent NaCloisite and 87.5 weight percent PEO-b-PCL 5K–20K (sample Ex. 5). The XRD data in FIG. 1 show that only the sample prepared in accordance with the instant invention (sample Ex. 5, curve C in FIG. 1) has a significant shift in diffraction peak position to lower 2θ (°). This peak shift is a result of intercalation of the NaCloisite clay by the PEO-b-PCL block copolymer.

The invention has been described in detail with particular reference to certain preferred embodiments thereof, but it will be understood that variations and modifications can be effected within the spirit and scope of the invention.

What is claimed is:

1. An article comprising a matrix polymer and clay wherein said clay is intercalated with a block copolymer, wherein said block copolymer comprises a hydrophilic block capable of intercalating said clay and a matrix compatible block compatible with said matrix polymer wherein said block copolymer comprises three blocks.

2. The article of claim 1 wherein said matrix polymer consisting of polyester.

3. The article of claim 2 wherein said polyester is selected from the group comprising poly(ethylene terephthalate), poly(butylene terephthalate), poly(1,4-cyclohexylene dimethylene terephthalate), poly(ethylene naphthalate) and amorphous glycol modified poly(ethylene terepthalate).

4. The article of claim 1 wherein said hydrophilic block comprises at least one member selected from the group consisting of poly(alkylene oxide), poly 6, (2-ethyloxazolines), poly(ethyleneimine), poly (vinylpyrrolidone), poly(vinyl alcohol), polyacrylamides, polyacrylonitrile, polysaccharides and dextrans.

5. The article of claim 1 wherein said hydrophilic block comprises at least one member selected from the group consisting of poly(alkylene oxide), poly 6, (2-ethyloxazolines), polysaccharide, poly (vinylpyrrolidone), poly(vinyl alcohol) and poly (vinylacetate).

6. The article of claim 1 wherein said hydrophilic block comprises poly(ethylene oxide).

7. The article of claim 1 wherein said hydrophilic block comprises polysaccharide.

8. The article of claim 1 wherein said hydrophilic block comprises poly(vinyl pyrrolidone).

9. The article of claim 1 wherein said hydrophilic block comprises poly(vinyl acetate).

10. The article of claim 1 wherein said matrix compatible block comprises polyester.

11. The article of claim 1 wherein said matrix compatible block consists of at least one member selected from the group consisting of polyester, acrylic, amide, polypropiolactone, poly β-butyrolactone, poly δ-valerolactone, poly ε-caprolactam and polycaprolactone.

12. The article of claim 1 wherein said clay comprises smectite clay.

13. The article of claim 1 wherein said clay comprises synthetic smectite clay.

14. The article of claim 1 wherein said clay comprises layered double hydroxide clay.

15. The article of claim 1 wherein said block copolymer has the structure A-B-A, wherein A is a hydrophilic member selected from the group consisting of poly(alkylene oxide), poly 6, (2-ethyloxazolines), poly(ethyleneimine), poly (vinylpyrrolidone), poly(vinyl alcohol), polyacrylamides, polyacrylonitrile, polysaccharides and dextrans and B is an oleophilic member selected from the group consisting of polyester, polyacrylic, polyamide, polypropiolactone, poly βbutyrolactone, poly δ-valerolactone, poly ε-caprolactam and polycaprolactone.

16. The article of claim 1 wherein said block copolymer has the structure A-B-A, wherein A is a member selected from the group consisting of poly(alkylene oxide), poly 6, (2-ethyloxazolines), polysaccharide, poly(vinylpyrrolidone), poly(vinyl alcohol) and poly(vinylacetate) and B is a member selected from the group consisting of polyester, polycaprolactone and polyamide.

17. The article of claim 1 wherein said block copolymer comprises three blocks and said matrix comprises a copolymer compatible with at least one block of said copolymer.

18. The article of claim 1 wherein said block copolymer comprises three blocks and said matrix comprises a blend of polymers compatible with at least one block of said copolymer.

19. The article of claim 1 wherein individual polymers in the blend of copolymers are compatible with separate blocks of said copolymers.

20. The article of claim 1 wherein said block copolymer further comprises a block that does not intercalate clay.

21. The article of claim 20 wherein said block copolymer that does not intercalate clay comprises polyester.

22. The article of claim 1 wherein said block copolymer further comprises a block comprising an oleophilic polymer.

23. The article of claim 1 wherein the ratio by weight of clay to block copolymer is between 1:99 and 99:1.

24. The article of claim 1 wherein the ratio by weight of clay to block copolymer is between 80:20 and 60:40.

25. The article of claim 1 wherein said clay has an aspect ratio of >10:1.

26. The article of claim 1 wherein said article is a support.

27. The article of claim 1 wherein said article is a layer in a multilayer structure.

28. The article of claim 1 wherein said clay comprises a weight % less than 70%.

29. The article of claim 1 wherein said clay comprises a weight % less than 20%.

30. An article comprising a matrix polymer and clay wherein said clay is intercalated with a block copolymer, wherein said block copolymer comprises a hydrophilic block capable of intercalating said clay and a matrix compatible block compatible with said matrix polymer wherein said matrix compatible block comprises 50 to 500 monomer repeat units of caprolactone and said polymer matrix comprises polyester.

31. The article of claim 30 wherein said polyester is selected from the group consisting of poly(ethylene terephthalate), poly(butylene terephthalate), poly(1,4-cyclohexylene dimethylene terephthalate), poly(ethylene naphthalate) and amorphous glycol modified poly(ethylene terepthalate).

32. The article of claim 30 wherein said hydrophilic block consisting of at least one member selected from the group of poly(alkylene oxide), poly 6, (2-ethyloxazolines), poly(ethyleneimine), poly(vinylpyrrolidone), poly(vinyl alcohol), polyacrylamides, polyacrylonitrile, polysaccharides, (2-ethyloxazolines), poly(vinylacetate), and dextrans.

33. The article of claim 30 wherein said hydrophilic block comprises poly(ethylene oxide).

34. The article of claim 30 wherein said hydrophilic block comprises polysaccharide.

35. The article of claim 30 wherein said hydrophilic block comprises poly(vinyl pyrrolidone).

36. The article of claim 30 wherein said hydrophilic block comprises poly(vinyl acetate).

37. The article of claim 30 wherein said clay comprises smectite clay.

38. The article of claim 30 wherein said clay comprises layered double hydroxide clay.

39. The article of claim 30 wherein said block copolymer comprises three blocks.

40. The article of claim 30 wherein said block copolymer has the structure A-B-A, wherein A is a hydrophilic member selected from the group consisting of poly(alkylene oxide), poly 6, (2-ethyloxazolines), poly(ethyleneimine), poly(vinylpyrrolidone), poly(vinyl alcohol), polyacrylamides, polyacrylonitrile, polysaccharides, and poly(vinylacetate).

41. The article of claim 30 wherein said block copolymer further comprises a block that does not intercalate clay.

42. The article of claim 30 wherein the ratio by weight of clay to block copolymer is between 1:99 and 99:1.

43. The article of claim 30 wherein said clay has an aspect ratio of >10:1.

44. The article of claim 30 wherein said article is a support.

45. The article of claim 30 wherein said article is a layer in a multilayer structure.

46. The article of claim 30 wherein said clay comprises a weight % less than 70%.

47. The article of claim 30 wherein said clay comprises a weight % less than 20%.

* * * * *